(12) United States Patent
Veillard (10) Patent No.: US 9,539,761 B2
(45) Date of Patent: Jan. 10, 2017

(54) PROCESS, DEVICE AND COMPOSITE PART FOR MANUFACTURING A HYBRID LENS

(75) Inventor: Emmanuel Veillard, Caen (FR)

(73) Assignee: Lentilles, Caen (FR)

( * ) Notice: Subject to any disclaimer, the term of this patent is extended or adjusted under 35 U.S.C. 154(b) by 0 days.

(21) Appl. No.: 14/234,858

(22) PCT Filed: Aug. 14, 2012

(86) PCT No.: PCT/FR2012/000338
§ 371 (c)(1),
(2), (4) Date: Jan. 24, 2014

(87) PCT Pub. No.: WO2013/024213
PCT Pub. Date: Feb. 21, 2013

(65) Prior Publication Data
US 2014/0152954 A1    Jun. 5, 2014

(30) Foreign Application Priority Data
Aug. 16, 2011 (FR) ...................... 11 02519

(51) Int. Cl.
*B29D 11/00*      (2006.01)
*B29C 65/00*      (2006.01)
(Continued)

(52) U.S. Cl.
CPC .......... *B29C 66/9532* (2013.01); *B29C 65/48* (2013.01); *B29D 11/00* (2013.01);
(Continued)

(58) Field of Classification Search
CPC .............. B29D 11/00; B29D 11/00038; B29D 11/00048; B29D 11/00067; B29D 66/9532; B29D 65/48; G02C 7/049
(Continued)

(56) References Cited

U.S. PATENT DOCUMENTS 2,225,040 A    12/1940   Dittmer
3,984,506 A    10/1976   Tsuetaki
(Continued)

FOREIGN PATENT DOCUMENTS

EP    1832913 A1    9/2007
FR    2956752 A1    8/2011
(Continued)

OTHER PUBLICATIONS

International Search Report of PCT/FR2012/000338, dated Mar. 12, 2012.

*Primary Examiner* — Bumsuk Won
*Assistant Examiner* — William R Alexander
(74) *Attorney, Agent, or Firm* — Banner & Witcoff, Ltd.

(57) ABSTRACT

The present invention relates to a process and to a device for manufacturing a hybrid contact lens (7, 21), from a composite part formed of a rigid central portion connected to a soft peripheral portion (9, 23) by an adhesive material (10, 24), to such a part and to such a lens. Starting from an oxygen-permeable rigid disc (2) and from a previously hydrated hydrophilic soft disc (3), a composite part (1) comprising three superposed layers is formed by bonding one disc to the other, said composite part (1) is dried for a defined time sufficient to allow the dehydration of the soft disc, then said composite part is dry cut with a machining tool by presenting the face of the hydrophilic soft portion (3) toward the tool in order to obtain the hybrid lens, by making a release strip (26) on the outer circumference (27) of the rigid peripheral portion.

19 Claims, 5 Drawing Sheets

(51) Int. Cl.
 *G02B 1/04* (2006.01)
 *G02C 7/04* (2006.01)
 *B29C 65/48* (2006.01)

(52) U.S. Cl.
 CPC .. *B29D 11/00038* (2013.01); *B29D 11/00048* (2013.01); *B29D 11/00067* (2013.01); *B29D 11/00259* (2013.01); *G02B 1/043* (2013.01); *G02C 7/049* (2013.01); *Y10T 156/125* (2015.01)

(58) Field of Classification Search
 USPC .................. 351/159.02, 159.12, 159.33, 159.62, 351/159.63, 159.7, 159.74
 See application file for complete search history.

(56) References Cited

U.S. PATENT DOCUMENTS

| | | | | |
|---|---|---|---|---|
| 4,558,931 A | * | 12/1985 | Fuhrman | 351/159.21 |
| 5,658,592 A | * | 8/1997 | Tanihara et al. | 424/488 |
| 6,783,721 B2 | * | 8/2004 | Higham et al. | 264/328.1 |
| 2008/0291391 A1 | * | 11/2008 | Meyers et al. | 351/160 H |

FOREIGN PATENT DOCUMENTS

| | | |
|---|---|---|
| GB | 1417650 A | 12/1975 |
| WO | 9406621 A1 | 3/1994 |

* cited by examiner

PROCESS, DEVICE AND COMPOSITE PART FOR MANUFACTURING A HYBRID LENS

The present invention relates to a process for manufacturing a hybrid contact lens of the type formed of a rigid central portion connected to a flexible peripheral portion by an adhesive material.

It also relates to a device for manufacturing such a lens, to a composite part machinable to such a lens, and to the hybrid lens itself.

Already known are dual or hybrid lenses which unite in a single lens the advantageous features of each of the two major classes of lenses, namely, on the one hand, rigid, gas-permeable (RGP) lenses and, on the other hand, soft, hydrophilic (SH) lenses.

In this type of lenses, the desired aim is to obtain the excellent optical results of a rigid lens, enabling effective compensation of the corneal irregularities, with the comfort of the soft lenses.

Document GB 1 417 650 thus describes a hybrid lens of the type above.

However, very little explanation is forthcoming as to the process for manufacturing this lens, with the various possible joining methods being aimed essentially at connection between the two parts of the lens coming about by welding during polymerization.

Although other means are cited, such as a chemical connection or else a welded connection by induction, by fusion, or by pressure, no particularization is given as to the steps specifically followed.

At the most it is understood that an adhesive may be provided between the two portions, these being the rigid portion and the flexible portion, without any knowledge as to how it might be introduced. In fact the only process of which slight details are given documents the casting of the flexible portion in liquid form around the rigid portion, followed by polymerization of said flexible portion.

The other processes that are known (for example described in PCT documents US 2005/004368 or WO 94/06621) relate to the manufacture of hybrid lenses by molding of the flexible portion onto the rigid portion, with or without an intermediate zone between the two that makes it easier to affix the one to the other.

In order to realize such moldings, it is therefore necessary to provide molds and an operation of polymerizing the flexible portion in the presence of the rigid portion.

Processes of this kind for manufacturing lenses have drawbacks; the resulting lenses are unsatisfactory and/or not very adjustable.

It is in fact the case that the lenses, owing to the difficulties of polymerizing a hydrophilic material in the presence of a nonhydrophilic material, exhibit problems of connection with one another.

Furthermore, owing to the need to use molds, the latter limit the sizes of the resulting lenses, unless the number of molds is multiplied, which gives rise to substantial cost.

The aim of the present invention is to provide a process, a device, an intermediate fabrication matrix or composite part, for obtaining a hybrid lens, and also such a lens, that represent an improved response, relative to their counterparts already known, to the requirements of the art, particularly in permitting extremely simple and rapid manufacture of quality hybrid lenses at low cost and with great adjustability, overcoming the various drawbacks referred to above.

In order to accomplish this, the present invention starts from a different concept from that in the prior art, which proposes manufacturing processes aiming to provide effective consolidation between rigid portion and flexible portion in the lenses by the formation of said flexible portion on the rigid portion directly or indirectly before polymerization.

With the invention, the aim is not to obtain polymerization of the one in the presence of the other; instead, two pre-existing disks, already polymerized, namely a flexible disk and a rigid disk, are taken as the starting points, and will be glued to one another.

This disk (or 'button') refers to a small cylinder of defined diameter and height: for example and in general, 12.7 mm in diameter and 5.5 mm in thickness.

These disks are manufactured commercially in particular by fabricators such as the companies Contamac or Polymer Technologies.

Their cost, consequently, may be minimized considerably.

The problem presented by the gluing of a flexible portion to a rigid portion, however, is a complex one.

This is because the hydrophilic flexible portion changes its volume and surface area according to its degree of hydration. Therefore, when—after the gluing of a rigid lens portion to a flexible portion, the flexible lens being dry in order to allow the glue to take—the lens is placed in a condition of nominal operation (that is, hydrated), a change in the volume of the flexible portion causes it to warp and/or causes weakening at the site of its fastening to the rigid portion, making it impossible to place it in a patient's eye.

In order to solve this problem, the invention proposes, in particular, an initial step of disk gluing, this being the gluing of the disk of gas-permeable rigid material, on the one hand, and the hydrophilic flexible disk, on the other, but after hydration of the flexible disk. Subsequent drying of the composite part thus produced is then carried out before operation by means of conventional tooling, after which it is placed in a nominal configuration of functioning of the lens, obtained by appropriate humidification.

The lens thus regains the initial conditions of bonding between the two disks, without deformation.

This prevents any warping of the flexible lens in activity situations, and/or prevents ongoing stress in the inside of the lens, which is a source of weakening. The lens therefore, exhibits a final curved shape which can be fitted to a patient's eye.

Another important advantage of the invention is associated with the unexpected possibility of simply determining the final diameter of the rigid portion with a single operation, namely by the cutting of the composite part to a corresponding selected depth.

With the aim of overcoming the drawbacks of the prior art and of obtaining the advantages indicated above, the present invention proposes, in particular, a process for manufacturing a hybrid contact lens formed of a rigid central portion connected to a flexible peripheral portion by an adhesive material, characterized in that starting from an oxygen-permeable rigid disk and from a hydrophilic flexible disk hydrated beforehand to a first defined level of hydration, one disk is glued to the other to form a composite part comprising three superposed layers, namely a first layer formed by the rigid disk, a second, bonding layer formed by the adhesive material, and a third layer formed by the flexible disk, said composite part is dried for a defined time sufficient to allow the dehydration of the flexible disk to a second defined level of hydration lower than the first, and then said composite part is dry-cut by a machine tool (turning and polishing), presenting the face of the hydrophilic flexible portion on the side of the tool (cutting diamond) to give the hybrid lens, providing a release band on the outer circumference of the rigid peripheral portion.

A release band is a peripheral ring on the rigid portion that is arranged to create a space between said rigid portion of the lens and the cornea, this space allowing easy removal of the lens, while avoiding any suction-cap effect between the two.

The reason is that the unexpected nature of the result in situ in a humid environment, on the basis of the composite part, sometimes has a secondary effect of some lenses sticking to the cornea because of substantial forces of capillarity on the eye, this being prevented by virtue of the presence of the release band.

In advantageous embodiments, moreover, one and/or the other of the following arrangements are employed:
the diameter of the rigid zone is defined by the machining to greater or lesser depth of the composite part;
the adhesive material comprises cyanoacrylate.

Cyanoacrylate contains cyanide, which in principle rules out its use; however, completely unexpectedly, it proves to be absolutely free of harm after the lens has been dried.

The reason is that when the adhesive material is in its liquid state (before polymerization), irritant emissions composed of cyanoacrylate monomers in vapor form are given off. Under the action of moisture, however, the cyanoacrylate monomers undergo immediate polymerization and become completely inert. This produces an entirely harmless join between the rigid zone and the hydrophilic flexible skirt of the lens;
a surface treatment is carried out on the rigid disk prior to gluing;
a surface treatment is carried out on the dry, flexible disk prior to gluing;
the surface treatment is a plasma treatment;
the rigid disk is cut beforehand so that its gluing surface has a convex shape, and the flexible disk is cut beforehand, so that its gluing surface, in the hydrated state, has a concave shape complementary to said convex shape;
the first level of hydration is between 50% and 100%;
the first level of hydration is between 54% and 70%;
the first level of hydration is between 55% and 60%;
the second level of hydration is less than 10%;
the second level of hydration is less than 2%.

The level of hydration is a % in which a level of 100% corresponds to the maximum percentage of water absorption for the material (saturation) and 0% corresponds to complete drying-out of said material.

The coefficient of expansion of the hydrophilic material, communicated by the manufacturer, makes it possible to calculate the dimensions of the hydrophilic disk (diameter and thickness) for a level of hydration of 100%. Since the changes in the sizes of the hydrophilic disk depending on the level of hydration follows a linear law, it is possible to determine the dimensions of the hydrophilic disk (diameter and thickness) for any level of hydration $\tau$ between 0% and 100%. For a given level of hydration $\tau$, when the diameter and thickness of the hydrophilic disk are known, it is possible to calculate the volume of the hydrated hydrophilic disk. The difference between the volume of the hydrated hydrophilic disk and the volume of the dry hydrophilic disk ($\tau=0$%) corresponds to the volume of water (and hence to the mass of waiter) used in its hydration. The drying of the composite material is evaluated by monitoring of the loss of mass of water over time (by comparing the mass of water used initially for the hydration of the disk).

The invention also provides a device for manufacturing a hybrid contact lens that employs the process described above.

It also relates to a device for manufacturing a hybrid contact lens formed of a rigid central portion connected to a flexible peripheral portion by an adhesive material, starting from an oxygen-permeable rigid disk, and from a hydrophilic flexible disk, characterized in that, with the flexible material being in the form of a disk, the device comprises means for cutting a concave surface on the hydrophilic flexible disk, means for cutting a convex surface complementary to the concave surface on the rigid disk, means for partially hydrating the hydrophilic disk to a defined first level of hydration, means for assembling, by gluing, the two disks to form a composite part, means for drying said composite part for a defined time sufficient to allow the dehydration of the flexible disk to a second defined level of hydration lower than the first, and means for dry-cutting said composite part by turning and polishing, to give said hybrid lens.

The hydration means advantageously comprise a balance for measuring the average weight of a flexible disk, a volumetric pipette for supplying physiological saline to a leak-tight chamber for retaining said flexible disk, and means for calculating the hydration time based on the average weight of said flexible disk and on the desired level of hydration.

In one advantageous embodiment the device comprises means for preparing the surfaces of said disks by a cold plasma treatment.

A treatment of this kind produces hydrophilic sites on the surface, increasing the surface energy of the materials and thereby ensuring improved wettability.

Likewise advantageously, the means for drying the composite part comprise hermetic containers for retaining the disks, with drying material.

The invention provides, furthermore, a composite part for manufacturing a hybrid contact lens formed of a rigid central portion connected to a flexible peripheral portion by an adhesive material, characterized in that it comprises an oxygen-permeable rigid disk, forming a first layer, a hydrophilic flexible disk hydrated to a first defined level of hydration, forming a third layer, and an adhesive bonding material between first and third layers, forming a second, intermediate, bonding layer.

The adhesive material is advantageously made so that it breaks down after a defined duration.

Likewise advantageously, the adhesive material comprising cyanoacrylate represents between 1% and 2.5% by mass, relative to the total mass of the composite material.

In advantageous embodiments, the first level of hydration, for the GM Advance material with 49% hydrophilicity, supplied by (step 15) the company Contamac (or its equivalent), is between 54% and 60% and/or the rigid disk has a convex-shaped gluing surface and the flexible disk has a concave-shaped gluing surface complementary to said convex shape, permitting angles of attachment between the two—flexible and rigid—portions that are more effective in their durability.

The invention also provides a hybrid lens manufactured on the basis of the process and/or using the device as described hereinabove, by the cutting of a composite part as has also been specified above.

A lens of this kind advantageously has its rigid portion diameter defined by the depth of machining of the composite part.

The invention will be more fully comprehended on a reading of the description below of particular embodiments, which are given hereinafter as nonlimiting examples.

Figure 1:
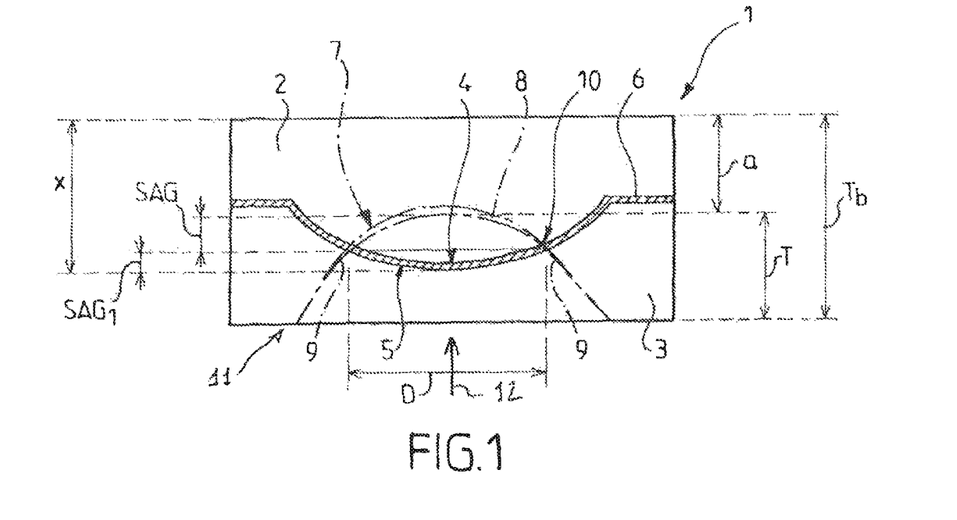
FIG. 1 is a diagram illustrating the manufacture of a hybrid lens according to one embodiment of the invention.

The invention makes reference to the drawings which accompany it, in which:

FIG. 1 shows (in section) a composite part 1 employed in the process of manufacturing as will be detailed with reference to the flow diagram of FIG. 2.

The part 1 is formed from a disk 2 made of rigid material and from a disk 3 made of hydrophilic flexible material that has been humidified beforehand, as will be described below, to a defined level of hydration.

The rigid disk 2 comprises a surface 4 which is convex—spherical, for example—and the flexible disk 3 comprises a concave surface 5 complementary to the surface 4.

The composite part further comprises an intermediate layer 6 of glue or of adhesive material in a thickness of several microns, as for example between 20 and 30 microns, which is represented in enlarged form on the figure for the purpose of illustration, between the respective surfaces 4 and 5 of the disks 2 and 3, which have been treated beforehand with plasma, for example.

After the part has been dried, it will be possible to machine the lens to form said hybrid lens 7 equipped with a rigid portion 8 and a flexible outer ring 9 connected to the rigid portion by the bead of glue 10.

In the remainder of the description, the same reference numbers will be used to denote the same elements or similar elements.

Figure 2:
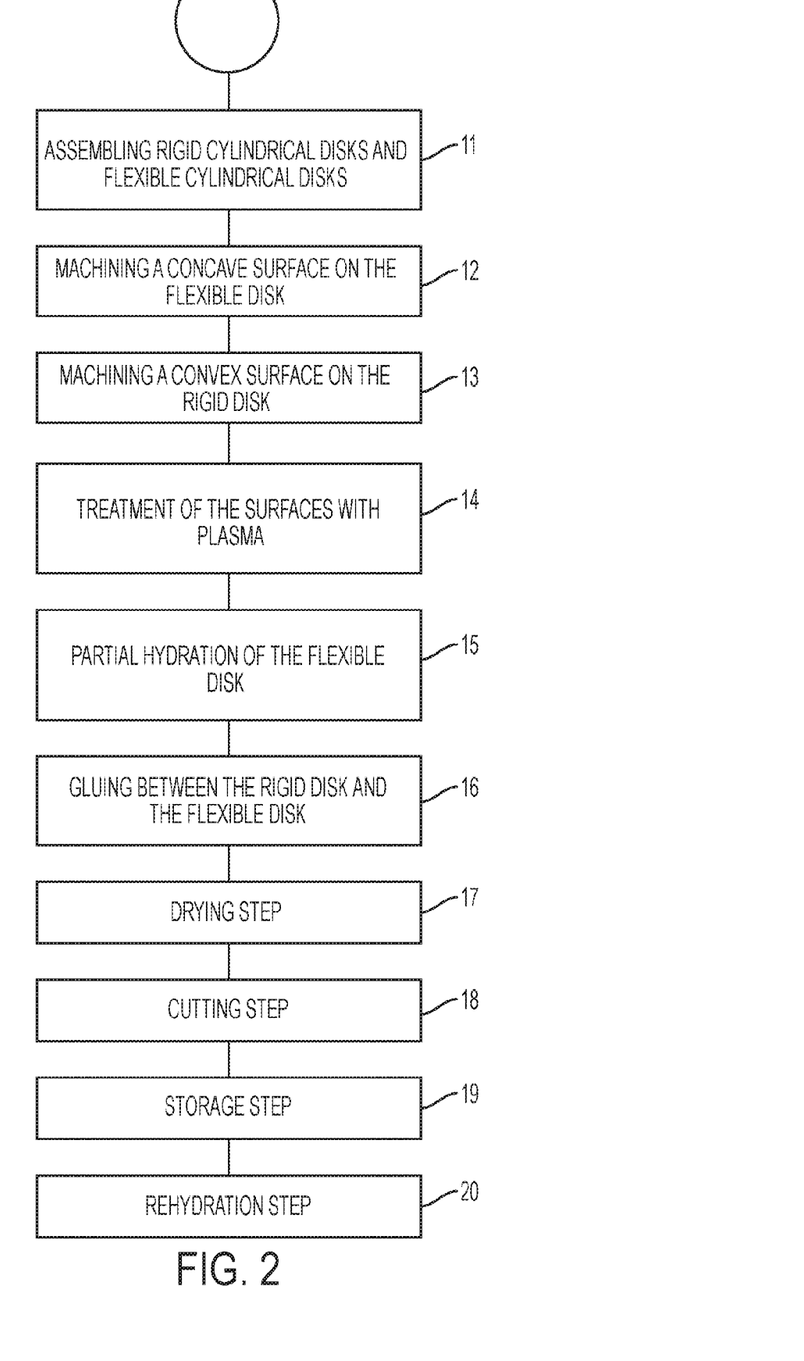
FIG. 2 is a flow diagram of the steps in the embodiment of the process according to the invention more particularly described here.

FIG. 2 shows a flow diagram for manufacture of a lens in accordance with the embodiment and inventive mode more particularly described here.

Starting from rigid cylindrical disks 2 and from hydrophilic, flexible cylindrical disks 3, which are commercial and have been assembled beforehand (step 11), examples being those sold under the names GM Advance 49% of the company Contamac, for the flexible disk, and Optimum extra DK 100 from the same company, Contamac, for the rigid disk, and with the conventional, computer-aided machine tools known to the skilled person, a sunken or concave surface 5 (step 12) is machined on the disk 3, on the one hand, and on the other hand a domed or convex surface 4 is machined (step 13) on the disk 2.

More specifically, the rigid portion here is machined to create a domed inner surface whose radius or radii of curvature correspond to that (or those) of the hydrophilic flexible portion in the hydrated state, calculated beforehand in a manner known per se from the geometry of the dry disk and its degree of hydration (swelling). In view of the customary diameters selected for the disks (d=11.5 mm), the nominal radius of curvature advantageously used for a spherical surface is, for example, R=6.5 mm; however, other radii are of course possible, in particular a zero radius corresponding to flat assembly, or radii R=8 mm or 7 mm or 6 mm.

Figure 3:
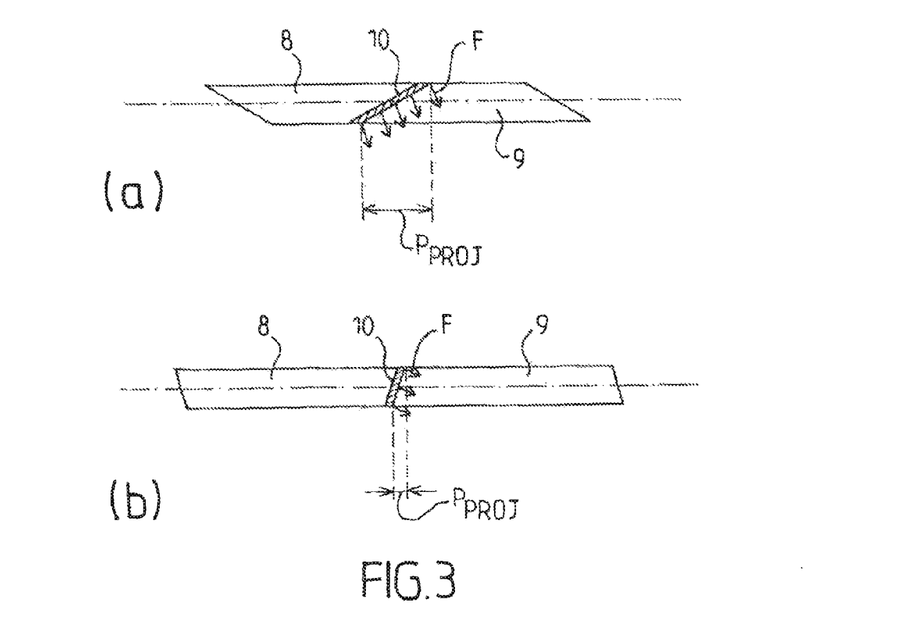
FIG. 3 shows, in section, two embodiments of the joining zone between rigid portion and flexible portion.

With reference to FIGS. 3(a) and 3(b), two cross sections of hybrid lens have been shown, at the site of the joining zone between rigid portion and flexible portion.

The joining zone here is subject to adhesive forces F perpendicular to the adhesion surface.

In the case of flat assembly (FIG. 3a), the slope P of the joining surface is shallow relative to the axis of the lens, and the projected slope $P_{PROJ}$ in the example is approximately 0.5 mm.

In this case, the vertical component of the adhesive force is substantial, and may therefore cause a thickening to form at the join on hydration of the lens.

In contrast, sunken-geometry assembly proves to be useful in order to minimize the modulus of the vertical component of the bonding force. In this case [FIG. 3(b)], the slope of the joining surface is greater, relative to the axis of the lens, than in the case of flat assembly, but its projection $P_{PROJ}$ is smaller—for example, here, it is 0.19 mm for a variable radius of curvature R of between 6 and 7 mm. For a radius R=8 mm, the projected band would for its part—and in the sizing example, which is nonlimiting—be 0.22 mm.

With the sunken-geometry assembly, therefore, it is found that the flexible portion of the lens is subject to less substantial stresses in the joining zone, with the thickening effect disappearing.

With reference, again, to FIG. 2, the surfaces 4 and 5 are then treated with plasma (step 15) to further increase the adhesion surface areas which will be employed.

To accomplish this, a cold plasma treatment of the disks is used, with, for example, simple gases such as Ar, $H_2$, $O_2$, $CO_2$, $N_2$, $NH_3$, etc., under conditions which are known to the skilled person.

For example, with an oxygen plasma treatment of one to two minutes, with a pressure of 0.6 mbar absolute maintained in the treatment chamber, on a rigid disk from the company Contamac that is known under the name "Optimum extra", and employing a reasonable power of the plasma generator, the contact angle (wettability) will change, for example, from 110° to 15° immediately after treatment, although it may subsequently climb to 35° again after aging in the storage liquid.

The next step (16) is a step of partial hydration of the hydrophilic disk.

It takes place, for example, with physiological saline, taken up by means of a precision volumetric micropipette whose take-up tip is sterilized at 120° for 30 minutes.

The value for the volume of water to be taken up is calculated talking account of the volume of physiological saline required for the hydration of a whole disk, and so to reach the set level of hydration, and of the ratio between the mass of the whole disk and the mass of the concave disk.

Hydration takes place in cases, for example, for contact lenses, made from fluid-tight polypropylene.

The cases and their screw stoppers are sterilized at 120° for 30 minutes, the stopper being removed during sterilization to prevent the deformation of the material.

It is generally found—though this depends, of course, on the material of which the disks are formed—that these disks are completely hydrated after 5 days.

The hydration protocol envisages, for example, the following steps:
a) determination of the average weight of the concave whole hydrophilic flexible disks by means of a balance. This step is necessary in order to be able to calculate the level of hydration of the disks.
b) Cleaning of the concave disks (using a tissue) to remove any residue in dust form due to the step of formation of the concavity.
c) Hydration of the hydrophilic flexible disks.

The next step is step 17, a step of gluing between the rigid disk and the hydrated flexible disk.

It is carried out with a monomeric glue, for example a cyanoacrylate glue, by applying the two respective surfaces 4 and 5 of the disks so one another in a manner known per se, and for a time and with a pressure sufficient for gluing to be effective and durable, to form the composite part 1.

Among glues with a composition based on cyanoacrylate, it is possible, for example, to select the products of the company Henkel that are known under the names Loctite 4011 and Loctite 4061, which have proven particularly advantageous, and especially Loctite 4061.

It therefore emerges from tests that a rigid disk glued to a flexible disk which has been hydrated beforehand with a level of hydration of 55.4% (the assembled disks having subsequently been dried for a week at ambient temperature, as will be described hereinafter) give an extremely cohesive block.

On the basis of the assembled part, indeed, an image (FIG. 5) was obtained accordingly of the joining zone of the hybrid disk, captured using a scanning electron microscope with a magnification of 300, which shows excellent cohesion.

Figure 5:
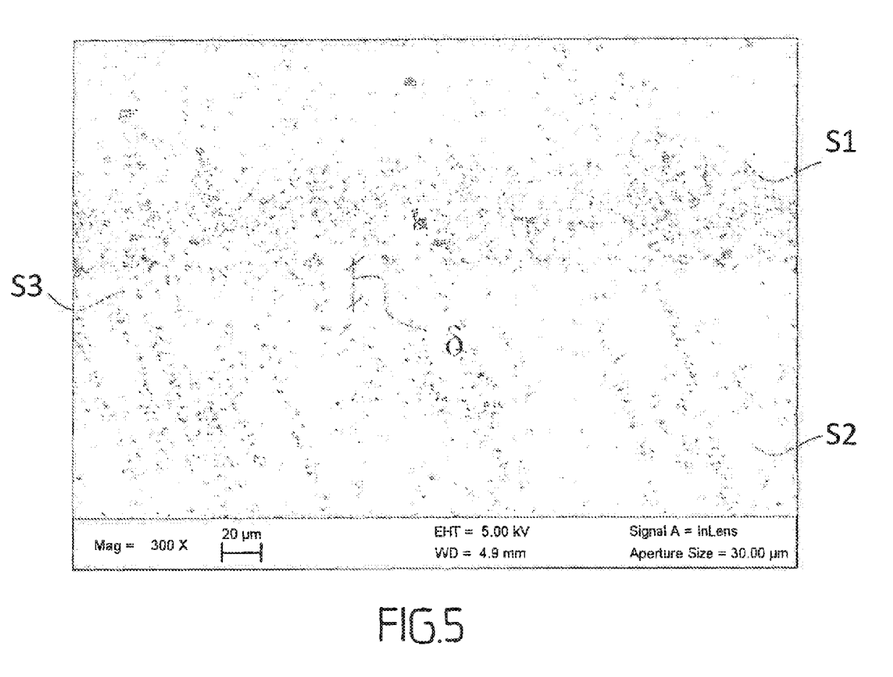
FIG. 5 is an enlarged scanning electron microscopy (SEM) photograph of the junction zone between a rigid disk and a hydrophilic flexible disk in one embodiment of the invention, illustrating the exceptional result obtained.

In this image, it is possible to observe high uniformity of adhesion at the junction between the two substrates S1 and S2 and the glue layer S3 with a thickness substantially equal to 26 microns.

The next step is the drying step 17.

Following assembly of the composite parts, they are left to dry under ambient conditions for a day, the aim being to lose the excess water, and are subsequently placed into hermetically closed jars with a desiccant. Use is made here, for example, of a 750 mm³ volume containing silica gel (for example, a product known under the name Chamelon from the company BDH pro labo) so as to approach complete dehydration, which is substantially attained after 14-18 days.

The volume of silica gel used to dry approximately 100 disks under these conditions is around a third of the volume of the jar.

Figure 4:
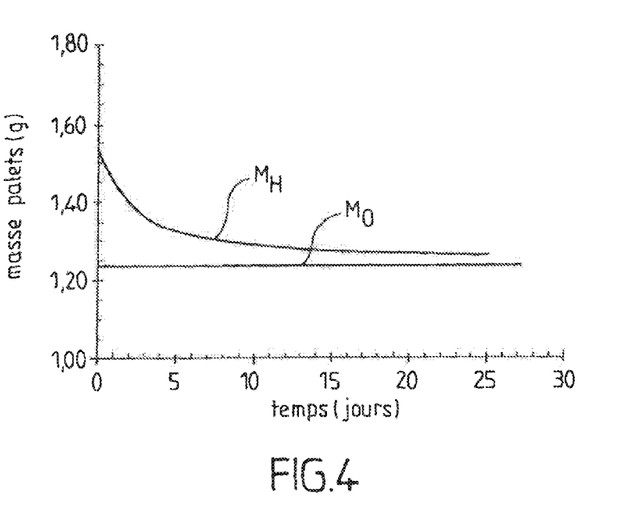
FIG. 4 is an example of a drying curve obtained with a composite part according to one embodiment of the invention.

FIG. 4 shows the loss of weight as a function of time for 10 composite parts.

The time T=0 corresponds to the instant of bonding.

The anticipated mass for complete drying corresponds to the mass of the hybrid composite parts minus the mass of water used for hydration.

This figure is calculated using the following formula:

$$M_{water}=(d_{ps} \cdot V_{ps})-V_{ps} \cdot C_{nacl}$$

The values $d_{ps}$, $V_{ps}$ and $C_{nacl}$ are, respectively, the density of the physiological saline, estimated at 1.013 g/ml, the volume of physiological saline used for hydration of the disks, and the concentration of NaCl salt in the physiological saline (=0.9 g/1.00 ml).

It is found that the rate of drying of the parts is high in the initial days, and then reduces, the mass tending progressively toward the anticipated mass calculated for complete drying.

After a period of the order of two weeks, the drying obtained is already sufficient for proper machining of the composite parts, allowing the manufacture of the hybrid lenses.

In the embodiment described here, the parts are kept in the jars for three or four weeks, before being packaged in empty jars or in sealed aluminum sachets.

The disks may advantageously be dried in a fan oven at 40° C., to obtain complete drying after seven days.

The next step is the cutting step 18.

Reference here will be again to FIG. 1: this step takes place by presentation of the outer face 11 of the flexible disk 3 on the side 12 of the cutting diamond, on the basis of the following parameters:

$T_b$: total thickness of the composite part 1.
T: partial thickness of the portion to be removed in order to give the desired deflection SAG.
SAG: deflection desired for a lens diameter D.
$SAG_1$: deflection for the same diameter D with a radius of curvature r.

The lens machining operation will obviously be dependent on the corrections it is desired to effect, in a manner like per se.

Figure 6:
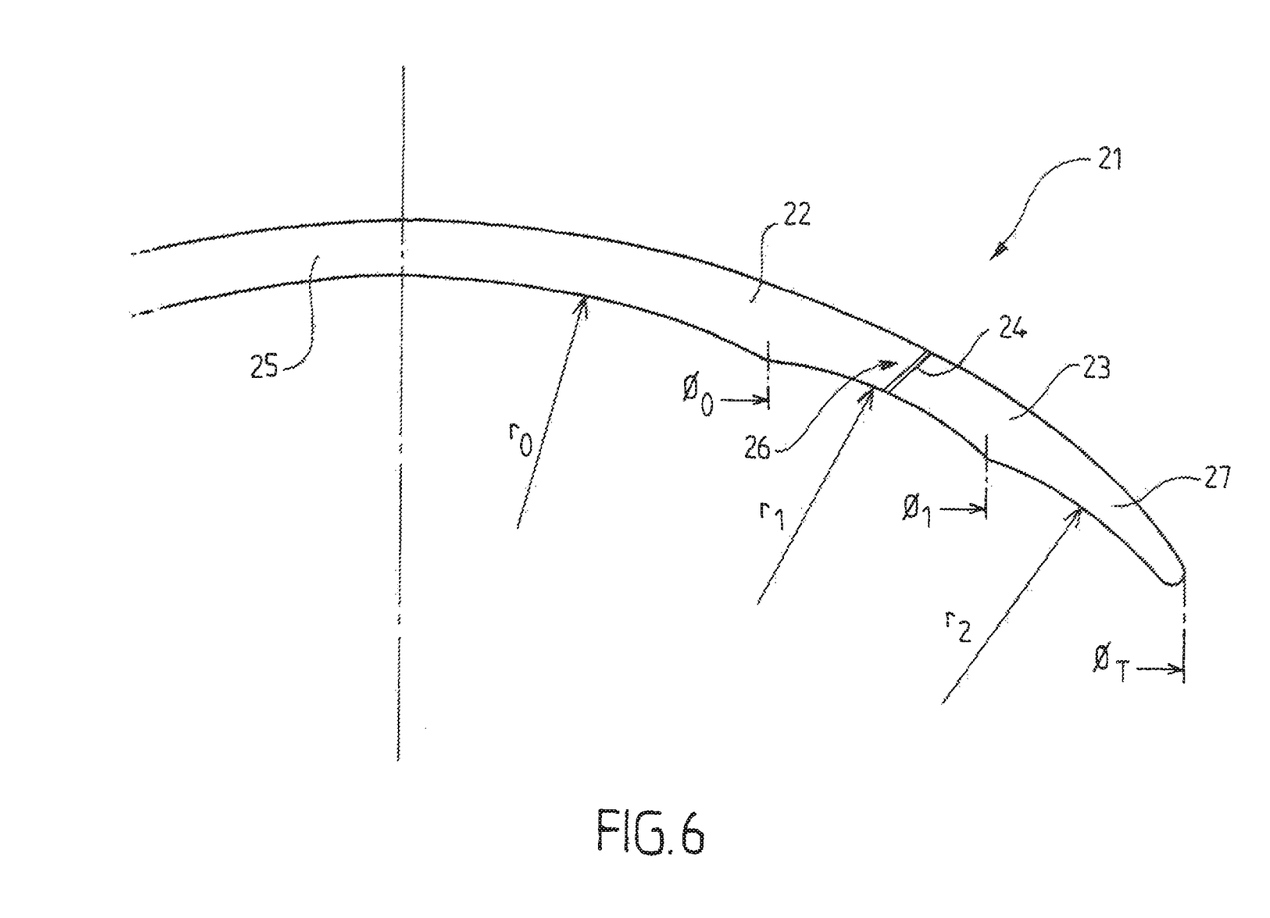
FIG. 6 is a sectional view of the periphery of the flexible portion, showing one embodiment of a release band according to the invention.

More specifically, according to the embodiment of the invention described more particularly and in reference to FIG. 6, a partial side view is shown of a hybrid lens 21, comprising a rigid portion 22 connected to a flexible portion 23 by an adhesive material 24. The central portion 25 of the lens is connected to an annular, peripheral release band 26, which is cut with a first radius $r_1$ (a value which may vary, for example, between 3 and 13 mm, with an average value $r_{1n}=11.5$ mm) on a zone situated at the junction, therefore straddling the rigid zone 22 and the hydrophilic flexible sons 23.

The value of $r_1$ may be constant, to give a wall in the shape of a spherical portion, or may be variable, with an eccentricity factor e.

The flexible portion, for its part, ends with an end 27 which is dry-cut with a radius $r_2$, to form a more cambered portion than that obtained with the radius $r_1$, of less than 4 to 8 mm, for example, to compensate the flattening of this zone on final hydration of the finished lens.

The reason is that the flexible zone flattens by a variable factor, depending on the first level of hydration used for the manufacture of the hybrid disk. The selection of the dry cutting radius of this zone, $r_2$, is dependent on the desired flattening as a function of the morphology of the cornea in the augmented eye.

The contact lens professional determines the profile of the hybrid lens in dependence on measurements and observations made on his or her patient, using the principles known in the art of adapting contact lenses.

This release band creates a space between the lens and the cornea that prevents the latter being subject to a suction-cup effect.

Without a release band, the small, uniform space between the rigid zone and the cornea, indeed, gives rise to an excessive capillarity force in the rigid zone, which prevents easy removal of the lens under certain eye configurations.

The cutting step 18 is followed by a brief intermediate storage step 19, then by a rehydration step 20, the hybrid lenses being subsequently conditioned in a contact lens decontamination solution (for example, in the solution known under the name Nitilens GP and manufactured by the company Avizor), before being delivered to the patient for insertion.

Figure 7:
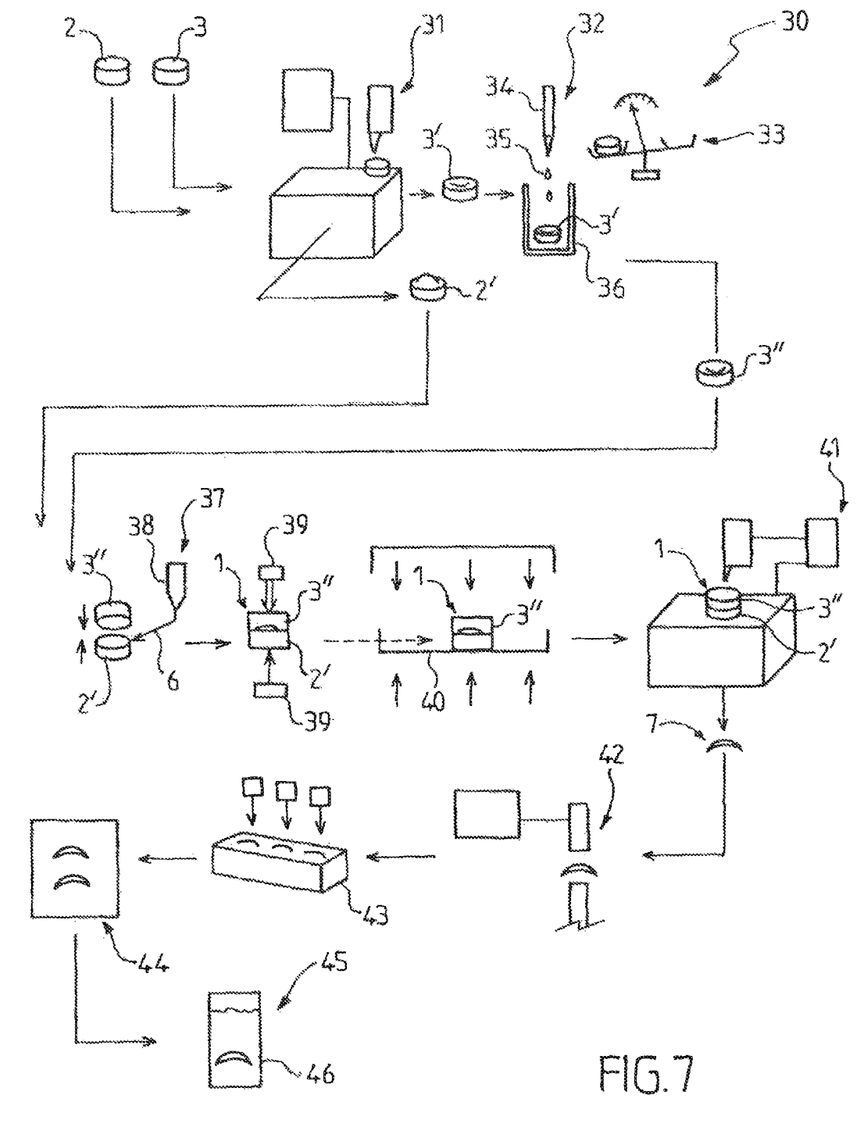
FIG. 7 is a schematic view of a device according to one embodiment of the invention.

FIG. 7 shows, schematically, one embodiment of a device 30 according to the invention.

The rigid 2 and flexible 3 disks are brought onto first cutting means 31, known per se, as for example a lathe referenced under the Optaform name from the company Starling, allowing production of disks 2' and 3' that are machined, respectively, with doming and with a concavity.

The hydrophilic disks 3' are then hydrated by hydration means 32 comprising a balance 33, a volumetric pipette 34 for supplying physiological saline 35 to a fluid-tight enclosure 36 for retaining said flexible disk 3'.

Provided subsequently are means 37 for the glued assembly of the two disks, with glue 6, to give the composite part 1, comprising, for example, a glue injector 38, and means 39 for pressing for a defined time with a defined force, as for example 10 s with a pressure of 2 kg, adaptable in a manner known per se by the skilled person according to the specifications of materials used.

Drying means 40 are provided next, formed, for example, by a protected support situated in a regulated ambient temperature room for a sufficient time.

Cutting and polishing means 41 known per se an Optoform digital lathe 40 are then provided, for cutting the hybrid lens according to the patient's particular data and as described above, before a checking step using, for example, interferometric checking tools 42 which are known per se.

Ultimate refining (polishing, refining of the edges, etc.) is optionally provided on a machine 43 of known type, before dry storage at 44, for a reduced time (1 to 2 days), then humid storage at 45, under use conditions, in conventional antiseptic tanks, for example.

With regard to the materials used, it is noted that the rigid lenses comprise, nonlimitatively, the following components and/or derivatives thereof, taken alone or in combination:
Trimeththyl-siloxyl; methyl methacrylate; ethyl methacrylate; ethylene glycol dimethacrylate; octafluoropentyl methacrylate; tetramethyldisiloxane; ethylene glycol dimethacrylate; pentafluorophenyl acrylate; 2-(trimethylsiloxyl) methacrylate; bis(2-metharyloxyphenyl)propane; N-[2-(N, N-dimethylamino)ethyl; onethacrylate; N-[2-(n,n-dimethylamino)ethyl; methacry; vinylpyrolidone; N,N-dimathacrylamide; acrylamine; hydroxyethyl methacrylate; siloxane ethylene glycol dimethacrylate; trifluoroethyl methacrylate; pentafluorostyrene; pentafluoropropyl methacrylate; unsaturated polyester; p-vinylbenyl hexafluoroisopropyl ether; siloxanylalkylamide; styrenes; siloxanylstyrenes—polymers resulting from polystyrene; fluorine/styrene; silicone/styrene.

The flexible portion in turn may be formed here, again nonlimitatively, from one and/or other of the following components, or derivatives thereof, taken alone or in combination:
Poly HEMA; hydroxyethyl acrylate; dihydroxypropyl methacrylate; polyethylane glycol; methyl methacrylate; ethyl methacrylate; butyl methacrylate (BMA), hexyl methacrylate (HMA), ethyl acrylate (EA), butyl acrylate (BA), acetoxysilane; ethylene glycol dimethacrylate; phenylethyl acrylate; zero-gel; Silicon-Hydrogel; polyethylene oxide.

The adhesive material may for its part also be selected from the adhesive materials, resins or other mixtures, of monomers and derivatives thereof, alone or in combination, as follows:
Cyanoacrylates and all derivatives of cyanoacrylates; ethyl cyanoacrylates; butyl cyanoacrylates; vinyl acetate; trifluoroethanol; methacrylates (C1 to C6); acrylate (C1 to C6); ethanediamine; 2-hydroxyethyl methacrylate (HEMA) and other esters of methacrylic acid formulated on the basis of bases acrylic bases; fluorine; silicone; fluorine/silicone; styrene and resulting polymers such as polystyrene; fluorine/styrene; silicone/styrene.

As is self-evident and as also results from the text above, the present invention is not limited to the embodiments described more particularly.

On the contrary, the invention embraces all variants thereof, and especially those in which the release band is configured differently.

The invention claimed is:

1. A method for manufacturing a hybrid contact lens formed of a rigid central portion connected to a flexible peripheral portion by an adhesive material, wherein the method comprises:
    starting from a rigid disk that is oxygen-permeable and from a flexible disk that is hydrophilic and is hydrated beforehand to a first defined level of hydration, gluing the rigid disk and the flexible disk to each other to form a composite part comprising three superposed layers, namely a first layer formed by the rigid disk, a second layer formed by the adhesive material, and a third layer formed by the flexible disk, wherein the adhesive material comprises cyanoacrylate or a derivative of cyanoacrylate;
    drying the composite part for a defined time sufficient to allow for dehydration of the flexible disk to a second defined level of hydration lower than the first defined level; and
    dry-cutting, by a machine tool, the composite part by at least presenting a face of the flexible disk on a side of the machine tool, and providing a release band on an outer circumference of the rigid central portion to prevent a suction-cup effect.

2. The method as claimed in claim 1, wherein a diameter of the rigid central portion is defined by machining the composite part to greater or lesser depth.

3. The method as claimed in claim 1, wherein a surface treatment is carried out on the rigid disk prior to gluing.

4. The method as claimed in claim 1, wherein a surface treatment is carried out on the flexible disk prior to gluing and prior to being hydrated to the first defined level of hydration.

5. The method as claimed in claim 3, wherein the surface treatment is a plasma treatment.

6. The method as claimed in claim 1, wherein the rigid disk is cut beforehand so that its gluing surface presents a convex shape, and the flexible disk is cut beforehand so that its gluing surface presents, when the flexible disk is hydrated, a concave shape complementary to the convex shape.

7. The method as claimed in claim 1, wherein the first defined level of hydration is between 50% and 100%.

8. The method as claimed in claim 1, wherein the first defined level of hydration is between 54% and 70%.

9. The method as claimed in claim 1, wherein the first defined level of hydration is between 55% and 60%.

10. The method as claimed in claim 1, wherein the second defined level of hydration is less than 10%.

11. The process method as claimed in claim 1, wherein the second defined level of hydration is less than 2%.

12. A device for manufacturing a hybrid contact lens formed of a rigid central portion connected to a flexible peripheral portion by an adhesive material, starting from a rigid disk that is oxygen-permeable and from a flexible disk that is hydrophilic, wherein the device comprises:
    means for cutting a concave surface on the flexible disk;

means for cutting a convex surface complementary to the concave surface on the rigid disk;

means for partially hydrating the flexible disk to a defined first level of hydration;

means for gluing, using the adhesive material that comprises cyanoacrylate or a derivative of cyanoacrylate, the rigid disk and the flexible disk to each other to form a composite part;

means for drying the composite part for a defined time sufficient to allow for dehydration of the flexible disk to a second defined level of hydration lower than the first; and means for dry-cutting the composite part by turning and polishing.

13. The device as claimed in claim 12, wherein the means for partially hydrating the flexible disk comprises a balance for measuring an average weight of the flexible disk and a volumetric pipette for supplying physiological saline to a leak-tight retention chamber for the flexible disk.

14. The device as claimed in claim 12, comprising means for preparing surfaces of the rigid disk and the flexible disk by a cold plasma treatment.

15. The device as claimed in claim 12, wherein the means for drying the composite part comprises hermetic containers for retaining the rigid disk and the flexible disk with drying material.

16. A composite part for manufacturing a hybrid contact lens formed of a rigid central portion connected to a flexible peripheral portion, wherein the composite part comprises:

a rigid disk that is oxygen-permeable and that forms a first layer;

a flexible disk that is hydrophilic, that is hydrated to a first defined level of hydration between 54% and 60%, and that forms a third layer; and an adhesive bonding material that comprises cyanoacrylate or a derivative of cyanoacrylate, that is between the first and third layers, and that forms a second layer, wherein the first, second and third layers are superposed.

17. The part as claimed in claim 16, wherein the rigid disk exhibits a convex-shaped gluing surface and the flexible disk exhibits a concave-shaped gluing surface complementary to said convex shape.

18. A hybrid lens obtained by cutting, after drying to a level of hydration lower than the first defined level, the composite part as claimed in claim 16.

19. The hybrid lens as claimed in claim 18, wherein the hybrid lens has a rigid-portion diameter with a value defined by a depth of machining of the composite part.

* * * * *

UNITED STATES PATENT AND TRADEMARK OFFICE
CERTIFICATE OF CORRECTION

PATENT NO. : 9,539,761 B2  Page 1 of 1
APPLICATION NO. : 14/234858
DATED : January 10, 2017
INVENTOR(S) : Emmanuel Veillard It is certified that error appears in the above-identified patent and that said Letters Patent is hereby corrected as shown below:

In the Claims

Column 10, Claim 11, Line 60:
Please delete "process method" and replace with --method--

Signed and Sealed this
Twenty-third Day of May, 2017

Michelle K. Lee
*Director of the United States Patent and Trademark Office*